United States Patent
Lee et al.

(10) Patent No.: US 10,343,495 B2
(45) Date of Patent: Jul. 9, 2019

(54) AIR CLEANING SYSTEM AND METHOD FOR VEHICLE

(71) Applicants: Hyundai Motor Company, Seoul (KR); Kia Motors Corporation, Seoul (KR); Hanon Systems, Daejeon (KR)

(72) Inventors: Sang Shin Lee, Gyeonggi-do (KR); Byeong Moo Jang, Gyeonggi-do (KR); Seung Hyun Kim, Shungcheongnam-do (KR); Dong Won Yeon, Gyeonggi-do (KR); Han Joo Lee, Daejeon (KR); Kang Woo Nam, Chungcheongnam-do (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 212 days.

(21) Appl. No.: 15/279,097

(22) Filed: Sep. 28, 2016

(65) Prior Publication Data

US 2017/0166037 A1 Jun. 15, 2017

(30) Foreign Application Priority Data

Dec. 15, 2015 (KR) .......... 10-2015-0178838

(51) Int. Cl.
*B60H 1/32* (2006.01)
*B60H 1/00* (2006.01)
(Continued)

(52) U.S. Cl.
CPC .......... *B60H 3/0078* (2013.01); *B60H 1/008* (2013.01); *B60H 1/00785* (2013.01);
(Continued)

(58) Field of Classification Search
CPC ............. B60H 3/0078; B60H 1/00785; B60H 1/00849; B60H 1/008; B60H 1/00864;
(Continued)

(56) References Cited

U.S. PATENT DOCUMENTS 5,701,752 A * 12/1997 Tsunokawa ........ B60H 1/00785
165/204
5,826,439 A * 10/1998 Baruschke ............. B60H 1/321
62/215
(Continued)

FOREIGN PATENT DOCUMENTS

JP 2009-073437 A 4/2009
JP 4311270 B2 8/2009
(Continued)

*Primary Examiner* — Cassey D Bauer
(74) *Attorney, Agent, or Firm* — Mintz Levin Cohn Ferris Glovsky and Popeo, P.C.; Peter F. Corless

(57) ABSTRACT

An air cleaning system for a vehicle includes: an air purification button generating an operation signal for purifying air in an interior of the vehicle; an inside air purification unit blocking air outside of the vehicle from being introduced into the interior of the vehicle and filtering and circulating air inside of the vehicle, when the air purification button is operated; a fog detection unit detecting a humidity of a window of the vehicle by detecting moisture on the window; and a controller controlling an operation of the inside air purification unit when the air purification button is operated and determining whether a defogging unit of the vehicle for removing the moisture on the window is to be operated based on a signal from the fog detection unit.

20 Claims, 2 Drawing Sheets

(51) Int. Cl.
*B60H 3/00* (2006.01)
*B60S 1/02* (2006.01)
*B60H 3/06* (2006.01)

(52) U.S. Cl.
CPC ..... *B60H 1/00849* (2013.01); *B60H 1/00864* (2013.01); *B60H 1/3207* (2013.01); *B60S 1/023* (2013.01); *B60H 2001/327* (2013.01); *B60H 2001/3244* (2013.01); *B60H 2003/0683* (2013.01)

(58) Field of Classification Search
CPC .......... B60H 1/3207; B60H 2001/3244; B60S 1/023
See application file for complete search history.

(56) References Cited

U.S. PATENT DOCUMENTS

| | | | | |
|---|---|---|---|---|
| 5,934,987 | A * | 8/1999 | Baruschke | B60H 1/00785 165/223 |
| 6,078,853 | A * | 6/2000 | Ebner | B60H 1/008 340/425.5 |
| 8,145,383 | B2 * | 3/2012 | Prokhorov | B60H 1/00849 454/139 |
| 8,694,166 | B2 * | 4/2014 | Quirk | G05D 23/1934 700/278 |
| RE45,939 | E * | 3/2016 | Yelles | B60H 1/3208 |
| 2004/0144911 | A1 * | 7/2004 | Stam | B60Q 1/143 250/208.1 |
| 2004/0241005 | A1 * | 12/2004 | Hersel | B60H 1/00507 417/48 |
| 2005/0124286 | A1 * | 6/2005 | Goldsmith | A61L 9/015 454/157 |
| 2005/0169821 | A1 * | 8/2005 | Boschert | B60H 3/0078 422/186.07 |
| 2006/0207325 | A1 * | 9/2006 | Kataoka | G01N 21/4738 73/335.01 |
| 2006/0289458 | A1 * | 12/2006 | Kim | B60H 1/00785 219/497 |
| 2008/0121034 | A1 * | 5/2008 | Lynam | B60H 1/00785 73/335.05 |
| 2009/0193821 | A1 * | 8/2009 | Ozeki | B60H 1/00742 62/89 |
| 2010/0126190 | A1 * | 5/2010 | Ha | B60H 3/0078 62/78 |
| 2011/0016896 | A1 * | 1/2011 | Oomura | B60H 1/00785 62/155 |
| 2012/0312520 | A1 * | 12/2012 | Hoke | B60H 1/00285 165/203 |
| 2013/0055746 | A1 * | 3/2013 | Yokoo | F25B 41/04 62/238.1 |
| 2014/0165838 | A1 * | 6/2014 | Suzuki | B60H 3/06 96/13 |
| 2014/0329450 | A1 * | 11/2014 | Hoke | B60H 1/00742 454/75 |
| 2015/0017900 | A1 * | 1/2015 | Baek | B60H 1/00742 454/75 |
| 2015/0088374 | A1 * | 3/2015 | Yopp | B60H 1/00785 701/36 |
| 2015/0118946 | A1 * | 4/2015 | Yeon | B60H 1/00764 454/75 |
| 2015/0127215 | A1 * | 5/2015 | Chatterjee | H04W 4/046 701/36 |
| 2015/0136376 | A1 * | 5/2015 | Niemann | B60H 1/00742 165/202 |
| 2016/0059674 | A1 * | 3/2016 | Kim | B60K 35/00 701/36 |
| 2016/0361972 | A1 * | 12/2016 | Blackley | B60H 3/0035 |
| 2017/0113517 | A1 * | 4/2017 | Kwon | B01D 46/0041 |
| 2018/0072136 | A1 * | 3/2018 | Kwon | B03C 3/04 |
| 2018/0209929 | A1 * | 7/2018 | Yamazaki | B60H 1/00785 |

FOREIGN PATENT DOCUMENTS

| | | |
|---|---|---|
| KR | 2008-0072319 A | 8/2008 |
| KR | 2009-0022490 A | 3/2009 |
| KR | 10-2013-0000186 A | 1/2013 |

* cited by examiner

AIR CLEANING SYSTEM AND METHOD FOR VEHICLE

CROSS-REFERENCE TO RELATED APPLICATION

This application claims under 35 U.S.C. §119(a) the benefit of and priority to Korean Patent Application No. 10-2015-0178838 filed on Dec. 15, 2015, wherein the entire contents of which are incorporated herein by reference.

BACKGROUND (a) Technical Field

The present disclosure relates generally to an air cleaning system and method for a vehicle. More particularly, the present disclosure relates to an air cleaning system and method for a vehicle capable of effectively removing contaminants, such as fine dust, from air in a vehicle interior.

(b) Background Art

In general, vehicles typically include an air conditioning system (or an air conditioner) which creates a comfortable environment for occupants by maintaining a suitable interior temperature in such a manner that inside/outside air is heated or cooled and made to flow into or circulate within the vehicle interior. Most vehicle air conditioning systems include a cooling device for cooling the vehicle interior and a heating device for heating the vehicle interior.

In recent years, vehicle air conditioning systems have also been equipped with a cluster ionizer for suppressing mold in order to alleviate a problem in which mold and the like are generated in the vehicle interior due to high indoor humidity. The cluster ionizer is operated by power applied thereto to generate anions and cations and releases the generated anions and cations into air, which is moved to an air outlet on an air purification passage, for sterilizing and deodorizing air to suppress bacteria and mold.

Meanwhile, there is a likelihood of contamination in the vehicle interior because it is small and sealed. In addition, air contamination of the interior can be further increased due to a variety of contaminants, such as fine dust, being introduced into the vehicle.

The above information disclosed in this Background section is only for enhancement of understanding of the background of the present disclosure, and therefore, it may contain information that does not form the related art that is already known to a person of ordinary skill in the art.

SUMMARY OF THE DISCLOSURE

The present disclosure has been made in an effort to solve the above-described problems.

In one aspect, the present disclosure provides an air cleaning system and method for a vehicle, which are capable of effectively removing fine dust from a vehicle interior using an air conditioning system, a cluster ionizer, an Automatic Defog Sensor (ADS), etc., which are mounted in a vehicle, and capable of simultaneously lowering the indoor humidity in the vehicle by operating a defogging unit when there is a concern about fog generation in the vehicle interior, e.g., due to driving the vehicle for a long period of time.

According to embodiments of the present disclosure, an air cleaning system for a vehicle includes: an air purification button generating an operation signal for purifying air in an interior of the vehicle; an inside air purification unit blocking air outside of the vehicle from being introduced into the interior of the vehicle and filtering and circulating air inside of the vehicle, when the air purification button is operated; a fog detection unit detecting a humidity of a window of the vehicle by detecting moisture on the window; and a controller controlling an operation of the inside air purification unit when the air purification button is operated and determining whether a defogging unit of the vehicle for removing the moisture on the window is to be operated based on a signal from the fog detection unit.

The inside air purification unit may include an intake door enabling inside air to be introduced when the air purification button is operated, an air filter filtering the introduced inside air, a blower generating suction force and blowing force for circulating the inside air, and a cluster ionizer releasing an ion to suppress bacteria and mold in the air of the interior of the vehicle.

The defogging unit may include a defrost door sending outside air to the window, an intake door enabling outside air to be introduced to the interior of the vehicle, an evaporator cooling the introduced outside air, and a blower blowing the cooled outside air to the defrost door.

When the defogging unit is determined to be operated based on the signal from the fog detection unit, the controller may operate the defogging unit and simultaneously stop operation of the inside air purification unit. When the operation of the defogging unit has completed, the controller may resume the operation of the inside air purification unit.

When the controller receives a signal for turning on a defrost mode switch in order to open a defrost door configured to send outside air to the window, when the intake door is switched to be operated in an outside air mode for introduction of air outside the vehicle, and when an air conditioner having the air filter is turned off, the controller may stop air cleaning operation of the inside air purification unit.

Furthermore, according to embodiments of the present disclosure, an air cleaning method for a vehicle includes: detecting an operation signal of an air purification button to purify air in an interior of the vehicle; controlling operation of an inside air purification unit to block air outside of the vehicle from being introduced into the interior of the vehicle and to filter and circulate air inside of the vehicle, when the operation signal of the air purification button is detected; and detecting whether to operate a defogging unit to remove moisture on a window of the vehicle based on a signal from a fog detection unit that detects a humidity of the window by detecting moisture on the window.

The method may further include operating the defogging unit and simultaneously stopping operation of the inside air purification unit when the defogging unit is determined to be operated based on the signal from the fog detection unit.

The method may further include resuming the operation of the inside air purification unit when the operation of the defogging unit has completed.

Furthermore, according to embodiments of the present disclosure, a non-transitory computer readable medium contains program instructions for performing an air cleaning method for a vehicle, the computer readable medium including program instructions that: detect an operation signal of an air purification button to purify air in an interior of the vehicle; control operation of an inside air purification unit to block air outside of the vehicle from being introduced into the interior of the vehicle and to filter and circulate air inside of the vehicle, when the operation signal of the air purification button is detected; and detect whether to operate a defogging unit to remove moisture on a window of the vehicle based on a signal from a fog detection unit that detects a humidity of the window by detecting moisture on the window.

Other aspects and embodiments of the disclosure are discussed infra.

BRIEF DESCRIPTION OF THE DRAWINGS

The above and other features of the present disclosure will now be described in detail with reference to certain embodiments thereof illustrated the accompanying drawings which are given hereinbelow by way of illustration only, and thus are not limitative of the present disclosure, and wherein.

Figure 1:
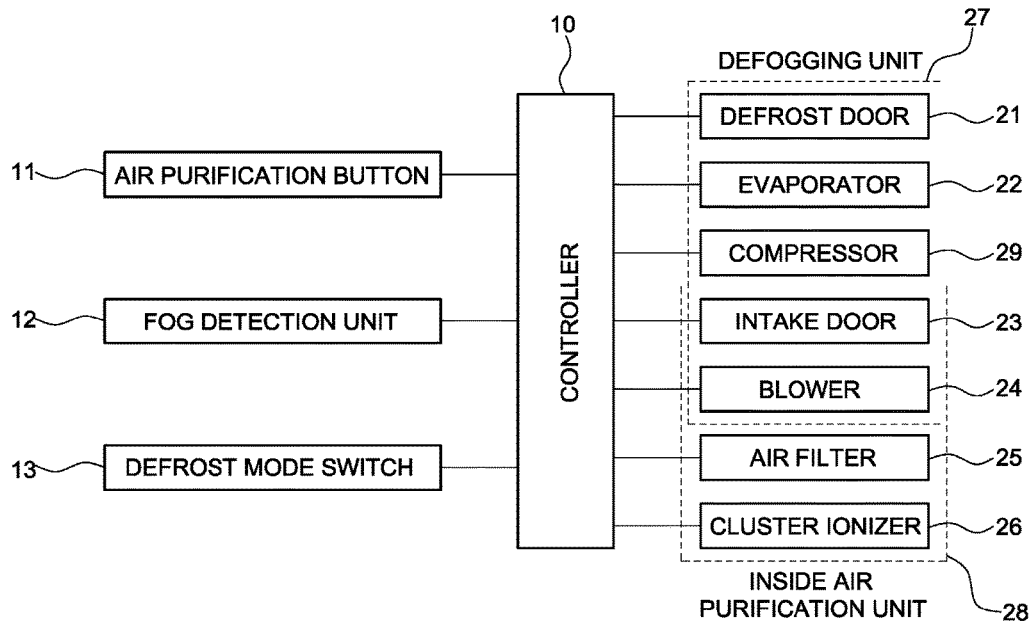
FIG. 1 is a block diagram illustrating an air cleaning system for a vehicle according to embodiments of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the disclosure will be described in conjunction with embodiments, it will be understood that present description is not intended to limit the disclosure to those embodiments. On the contrary, the disclosure is intended to cover not only the embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, embodiments of the present disclosure are described in detail.

As illustrated in FIG. 1, an air cleaning system for a vehicle according to embodiments of the present disclosure includes an air purification button 11 and an air conditioning system.

The air purification button 11 can be operated by a driver or other user in order to generate operation signals for cleaning/purifying air in a vehicle interior. The air purification button 11 may be provided on an instrument panel at the front of the vehicle interior so as to be easily operated by the driver or the user. Notably, while the present disclosure refers to an air purification "button," it should be understood that the button is merely one exemplary input device, and the air purification button 11 can encompass any input device suitable for receiving an "on/off" input from a user, including, but not limited to, a switch, a lever, a dial, and the like.

The air conditioning system includes an intake door 23 which allows air inside or outside of a vehicle to be selectively introduced thereinto, and selectively opens and closes an inside air inlet for the introduction of inside air or an outside air inlet for the introduction of outside air, a blower 24 which generates suction force and blowing force so as to blow inside or outside air introduced through the inlet opened by the intake door 23, a high-efficiency air filter 25 of an air conditioner which passes the introduced inside or outside air therethrough so as to filter foreign substances such as fine dust, an evaporator 22 of the air conditioner which is supplied with a refrigerant from a compressor 29 of the air conditioner so as to cool the air introduced by the blower 24, a defrost vent (not shown) configured to discharge air toward a window glass (alternatively referred to herein as, simply, a "window"), a defrost door 21 which opens and closes the defrost vent, etc.

Furthermore, the air conditioning system includes an Automatic Defog Sensor (ADS) 12 which detects a relative humidity around the window, a cluster ionizer 26 which generates ions to sterilize and deodorize air by suppressing bacteria and mold, and a controller 10 which controls the intake door 23, the defrost door 21, the compressor 29 and evaporator 22 of the air conditioner, the blower 24, etc., depending on detection signals from the ADS 12.

The ADS 12 is a fog detection unit which may detect fog and moisture on the window glass by detecting the relative humidity of the vehicle window glass. The intake door 23, the defrost door 21, the compressor 29 and evaporator 22 of the air conditioner, and the blower 24 are operated depending on the relative humidity of the window glass detected by the ADS 12, and thus moisture/fog on the window glass may be automatically removed. That is, when the ADS 12 is operated, the intake door 23, the defrost door 21, the compressor 29 and evaporator 22 of the air conditioner, and the blower 24 are operated, without separate operation by the user, by the controller 10 receiving signals from the ADS 12, thereby enabling moisture/fog on the window glass to be removed.

The controller 10 may determine whether it is necessary to operate a defogging unit 27 which includes multiple components (e.g., the intake door, the defrost door, the compressor and evaporator of the air conditioner, the blower, etc.) for removing fog on the vehicle window glass using the ADS 12. In addition, the air conditioning system includes a defrost mode switch 13 which may manually operate the defogging unit 27 for removing fog on the window glass.

When the defrost mode switch 13 is turned on by the manual operation of the user, who determines that moisture in the vehicle interior and on the window glass needs to be removed, the intake door 23, the defrost door 21, the compressor 29 and evaporator 22 of the air conditioner, and the blower 24 are operated by the controller 10 receiving signals from the defrost mode switch 13, thereby enabling fog on the window glass to be removed. The defrost mode switch 13 is provided, for example, on the instrument panel.

The cluster ionizer 26 is installed in a passage, in which air filtered by the high-efficiency air filter 25 provided in the air conditioner is blown and moved, and generates and releases anions and cations to sterilize and deodorize air to suppress bacteria and mold.

When the air purification button 11 is turned on, the controller 10 controls the operation of an inside air purification unit 28, which includes components (e.g., the intake door, the air conditioner, the blower, the cluster ionizer, etc.) for cleaning/purifying air in the vehicle interior, and simultaneously determines whether to operate the defogging unit 27 for removing moisture in the vehicle interior and fog (or moisture) on the window glass, based on detection signals received from the ADS 12 or the defrost mode switch 13 so as to control the operation of the components for removing fog and moisture.

Hereinafter, an air cleaning method according to embodiments of the present disclosure will be described with reference to FIGS. 2 and 3 based on the above configuration.

Figure 2:
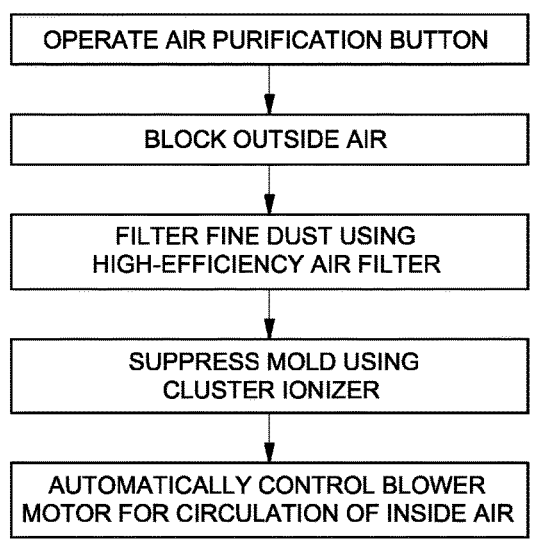
FIG. 2 is a diagram schematically illustrating a sequence of operation of the air cleaning system for a vehicle according to embodiments of the present disclosure.

As illustrated in FIG. 2, in the air conditioning system, when the user turns on the air purification button 11, the intake door 23 is controlled to be operated in an inside air mode, in response to the signals of the controller 10, so as to block outside air from being introduced into the vehicle interior, the blower 24 is operated to circulate inside air (i.e., air in the vehicle interior), the air conditioner is operated such that the high-efficiency air filter 25 filters foreign substances such as fine dust in air passing therethrough, and the cluster ionizer 26 is operated to sterilize air and suppress mold. That is, since the air conditioning system is switched to be operated in the inside air mode in which the intake door 23 blocks the introduction of outside air, only inside air is introduced into the vehicle and is circulated by the blower 24. In this case, foreign substances are filtered while the circulated inside air passes through the air filter 25.

When the air conditioner is operated, the compressor 29 is operated in order to supply a refrigerant to the evaporator 22. When the defogging unit 27 is then operated, the evaporator 22 reduces an amount of saturated water vapor in air in the process of cooling the air using the refrigerant supplied thereto, thereby performing a dehumidification function. In addition, foreign substances may be filtered from air by the moisture adhering to the evaporator 22.

Hereinafter, the air cleaning method according to embodiments of the present disclosure will be described in more detail with reference to FIG. 3.

Figure 3:
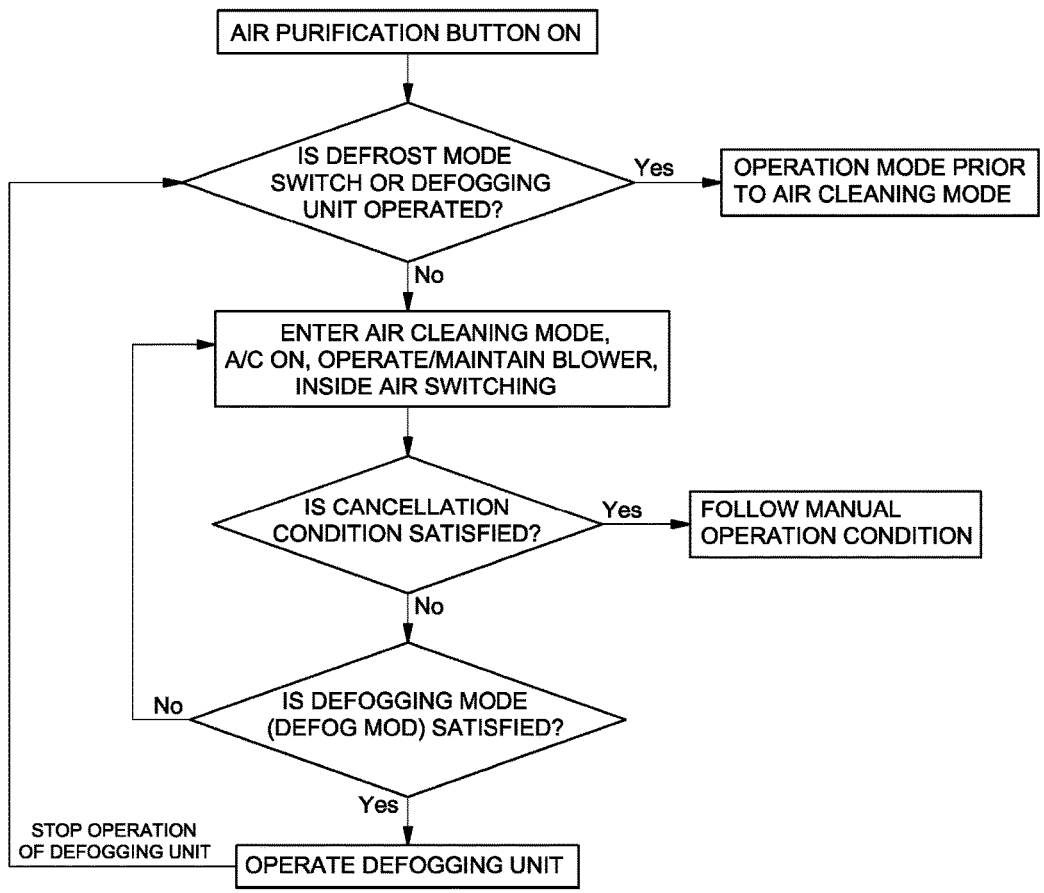
FIG. 3 is a flowchart for explaining an air cleaning method for a vehicle according to embodiments of the present disclosure.

As illustrated in FIG. 3, when the air purification button 11 is first turned on, the controller 10 first determines whether the defrost mode switch 13 is operated and the ADS 12 is operated for the detection of fog.

When the defrost mode switch 13 is determined to be operated or the ADS 12 is determined to detect fog on the vehicle window glass, the air conditioning system is operated and maintained in an operation mode that precedes an air cleaning mode in which the inside air purification unit 28 is operated, i.e., in a current mode by the controller 10, and the controller 10 again determines whether the defrost mode switch 13 is to be operated and the ADS 12 is to be operated for the detection of fog.

Here, the ADS 12 is determined to detect fog on the window glass only when it detects a relative humidity equal to or higher than a predetermined critical value. This determination is performed by the controller 10 receiving signals from the ADS 12. In addition, when it is determined that the defrost mode switch 13 is not operated and that the ADS 12 does not detect fog on the vehicle window glass, the controller 10 operates the inside air purification unit 28, which includes the air filter 25 of the air conditioner, the blower 24, the intake door 23, the cluster ionizer 26, etc., to remove contaminants such as fine dust and mold from air in the vehicle interior, and simultaneously operate the compressor 29 of the air conditioner for supplying a refrigerant to the evaporator 22 so as to prepare for the operation of the defogging unit 27 during the operation of the inside air purification unit 28.

When a condition that the air conditioning system is switched to a defogging mode from the air cleaning mode in order to remove contaminants from air in the vehicle interior is satisfied, the operation of the inside air purification unit 28 is stopped and the defogging unit 27 is operated so as to remove moisture generated on the window glass and simultaneously suppress the generation of moisture on the window glass.

In this case, in the state in which the intake door 23 is operated in an outside air mode and the defrost door 21 is opened in the defogging unit 27, outside air introduced by the suction force of the blower 24 is cooled by the evaporator 22 and is then moved to the window glass through the defrost door 21 by the blowing force of the blower 24. When the moisture generated on the window glass is removed, the operation of the defogging unit 27 is stopped, and the air conditioning system re-enters the air cleaning mode, according to the result of another determination of whether the defrost mode switch 13 is operated and the ADS 12 is operated for the detection of fog, to perform the air purification function by the inside air purification unit 28. In other words, when it is determined that the defrost mode switch 13 is not operated and the ADS 12 does not detect fog on the vehicle window glass after the operation of the defogging unit 27 is completed, the controller 10 resumes the operation of the inside air purification unit 28, the operation of which has stopped.

The controller 10 determines that the moisture generated on the window is removed when the ADS 12 detects a relative humidity equal to or higher than the predetermined critical value, and stops the operation of the defogging unit 27.

When a condition for cancellation of the air cleaning mode occurs while the inside air purification unit 28 enters and is operated in the air cleaning mode, the operation of the inside air purification unit 28 is stopped.

The condition for cancellation of the air cleaning mode is satisfied when the defrost mode switch 13 is turned on, the mode of the intake door 23 is switched to an outside air mode by an inside/outside air mode switch provided on the instrument panel, the mode of the air conditioning system is switched to an auto mode, the air conditioning system is turned off, the air conditioner is turned off, etc. When the condition for cancellation of the air cleaning mode is satisfied, the inside air purification unit 28 of the air conditioning system is operated according to a manual operation condition.

As such, it is possible to perform the air cleaning function in order to remove contaminants from air in the vehicle interior using the air conditioning system which is mounted in the vehicle, and to simultaneously perform the defog mode for moisture removal when there is the possibility of generation of moisture (i.e., fog) on the window due to the lengthy operation of the inside air mode for cleaning air, thereby enabling the air cleaning mode to be maintained for a long time without the concern about fog generation in the vehicle interior. In addition, since the air cleaning mode is maintained for a long period of time, it is possible to further increase interior cleaning efficiency and performance.

As is apparent from the above description, in accordance with an air cleaning system and method for a vehicle of the present disclosure, it is possible to effectively remove fine dust from the air in a vehicle interior using an inside air purification unit when intended by a user, and to simultaneously lower the indoor humidity of a vehicle by the operation of a defogging unit, when there is a concern about fog generation in the vehicle interior due to the driving of the vehicle for a long time, so as to remove and prevent fog on a vehicle glass. In addition, fine dust can be continually collected by resuming the operation of the inside air purification unit after the operation of the defogging unit is completed. As a result, the performance of fine dust removal can be increased by operating the inside air purification unit for a long period of time without a concern about reduced efficiency of operation due to fog generation. In addition, since the present disclosure uses an automatic air conditioning system, including a cluster ionizer, an ADS, etc., as the air conditioning system which is previously mounted in the vehicle, fine dust can be effectively removed from the vehicle interior without an unnecessary increase in costs.

The disclosure has been described hereinabove in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. An air cleaning system for a vehicle, comprising:
   an air purification button generating an operation signal for purifying air in an interior of the vehicle;
   an inside air purification unit blocking air outside of the vehicle from being introduced into the interior of the vehicle and filtering and circulating air inside of the vehicle, when the air purification button is operated;
   a fog detection unit detecting a humidity of a window of the vehicle by detecting moisture on the window; and
   a controller controlling an operation of the inside air purification unit when the air purification button is operated and determining whether a defogging unit of the vehicle for removing the moisture on the window is to be operated based on a signal from the fog detection unit.

2. The air cleaning system of claim 1, wherein the inside air purification unit includes:
   an intake door enabling inside air to be introduced when the air purification button is operated;
   an air filter filtering the introduced inside air; and
   a blower generating suction force and blowing force for circulating the inside air.

3. The air cleaning system of claim 1, wherein the inside air purification unit includes a cluster ionizer that releases an ion to suppress bacteria and mold in the air in the interior of the vehicle when the air purification button is operated.

4. The air cleaning system of claim 1, wherein the defogging unit includes:
   a defrost door sending outside air to the window;
   an intake door enabling outside air to be introduced to the interior of the vehicle;
   an evaporator cooling the introduced outside air; and
   a blower blowing the cooled outside air to the defrost door.

5. The air cleaning system of claim 1, wherein, when the defogging unit is determined to be operated based on the signal from the fog detection unit, the controller operates the defogging unit and simultaneously stops operation of the inside air purification unit.

6. The air cleaning system of claim 5, wherein, when the operation of the defogging unit has completed, the controller resumes the operation of the inside air purification unit.

7. The air cleaning system of claim 1, wherein, when the controller receives a signal for turning on a defrost mode switch in order to open a defrost door configured to send outside air to the window, the controller stops operation of the inside air purification unit.

8. The air cleaning system of claim 2, wherein, when the intake door is switched to be operated in an outside air mode for introduction of air outside of the vehicle, the controller stops operation of the inside air purification unit.

9. The air cleaning system of claim 2, wherein, when an air conditioner having the air filter is turned off, the controller stops operation of the inside air purification unit.

10. An air cleaning method for a vehicle, comprising:
    detecting an operation signal of an air purification button to purify air in an interior of the vehicle;
    controlling operation of an inside air purification unit to block air outside of the vehicle from being introduced into the interior of the vehicle and to filter and circulate air inside of the vehicle, when the operation signal of the air purification button is detected; and
    detecting whether to operate a defogging unit to remove moisture on a window of the vehicle based on a signal from a fog detection unit that detects a humidity of the window by detecting moisture on the window.

11. The air cleaning method of claim 10, wherein the inside air purification unit includes:

an intake door enabling inside air to be introduced when the air purification button is operated;

an air filter filtering the introduced inside air; and a blower generating suction force and blowing force for circulating the inside air.

12. The air cleaning method of claim 10, wherein the inside air purification unit includes a cluster ionizer that releases an ion to suppress bacteria and mold in the air in the interior of the vehicle when the air purification button is operated.

13. The air cleaning method of claim 10, wherein the defogging unit includes:

a defrost door sending outside air to the window;

an intake door enabling outside air to be introduced to the interior of the vehicle;

an evaporator cooling the introduced outside air; and a blower blowing the cooled outside air to the defrost door.

14. The air cleaning method of claim 10, further comprising:

operating the defogging unit and simultaneously stopping operation of the inside air purification unit when the defogging unit is determined to be operated based on the signal from the fog detection unit.

15. The air cleaning method of claim 14, further comprising:

resuming the operation of the inside air purification unit when the operation of the defogging unit has completed.

16. The air cleaning method of claim 10, further comprising:

stopping operation of the inside air purification unit when a signal for turning on a defrost mode switch in order to open a defrost door configured to send outside air to the window is received.

17. The air cleaning method of claim 11, further comprising:

stopping operation of the inside air purification unit when the intake door is switched to be operated in an outside air mode for introduction of air outside of the vehicle.

18. The air cleaning method of claim 11, further comprising:

stopping operation of the inside air purification unit when an air conditioner having the air filter is turned off.

19. The air cleaning method of claim 13, further comprising:

controlling operation of a compressor to supply a refrigerant to the evaporator to prepare for the operation of the defogging unit when the inside air purification unit is operated.

20. A non-transitory computer readable medium containing program instructions for performing an air cleaning method for a vehicle, the computer readable medium comprising program instructions that:

detect an operation signal of an air purification button to purify air in an interior of the vehicle;

control operation of an inside air purification unit to block air outside of the vehicle from being introduced into the interior of the vehicle and to filter and circulate air inside of the vehicle, when the operation signal of the air purification button is detected; and detect whether to operate a defogging unit to remove moisture on a window of the vehicle based on a signal from a fog detection unit that detects a humidity of the window by detecting moisture on the window.

* * * * *